Nov. 1, 1960

W. C. PIERCE 2,958,406

MAGNETIC TORQUE PRODUCING DEVICE WITH
LUBRICATED FRICTION FACES

Filed March 10, 1958

INVENTOR
William C. Pierce
By Darlen, Pitzner, Huttado Wolfe
ATTORNEY

United States Patent Office 2,958,406
Patented Nov. 1, 1960

2,958,406

MAGNETIC TORQUE PRODUCING DEVICE WITH LUBRICATED FRICTION FACES

William C. Pierce, Beloit, Wis., assignor to Warner Electric Brake & Clutch Company, South Beloit, Ill., a corporation of Illinois Filed Mar. 10, 1958, Ser. No. 720,161

2 Claims. (Cl. 192—107)

This invention relates to magnetic friction clutches and brakes having gripping surfaces which are covered with a lubricant film or less continuously either by submergence of the parts or by intermittent exposure thereof during service use.

When magnetic faces thus lubricated are drawn into gripping engagement under heavy pressure in initial service use, the torque developed will usually fall far short of the rated value and such failure and erratic operation may persist during continued operation. I have discovered that this difficulty is due to galling of the soft iron face and the tearing away of the metal thereof, this being accompanied by rolling up of this metal into minute ball-like particles which themselves become welded to one surface and cause a further galling action. These particles also separate the magnetic faces thus preventing the device from developing its rated torque. The difficulty, which does not ordinarily occur when the friction faces are operated dry, is believed to be attributable to the presence of the lubricant film and its action in precluding rapid wearing away and proper disposal of the torn off metal particles.

Based on the foregoing discovery, the present invention aims to reduce and substantially eliminate the possibility of galling of the lubricated friction surfaces in initial service use by covering at least one of the surfaces with a thin film of relatively soft metal which provides improved bearing action and facilitates wearing in and rapid work hardening of the opposed surfaces.

Figure 1:
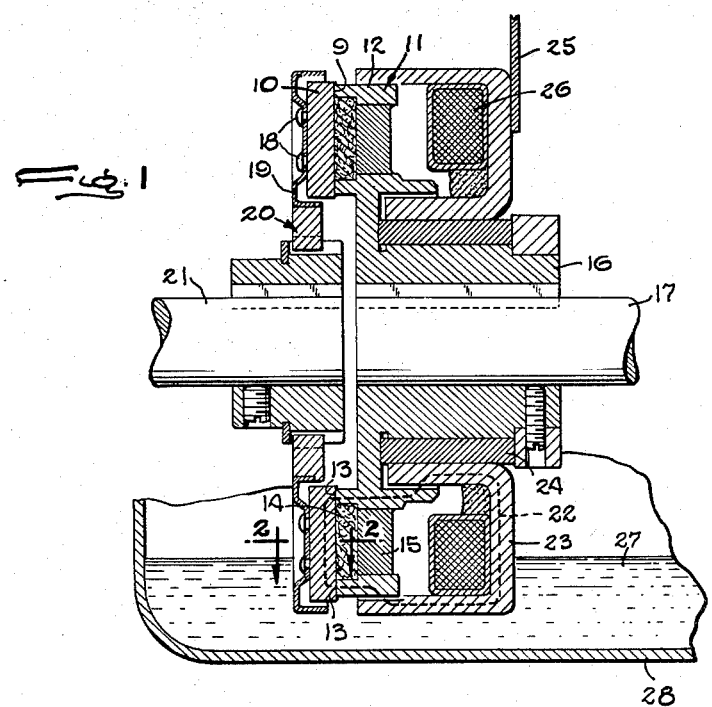

Other objects and advantages of the invention will become apparent from the following detailed description taken in connection with the accompanying drawings, in which Figure 1 is a fragmentary cross-sectional view of a magnetic friction clutch embodying the novel features of the present invention.

Figure 2:
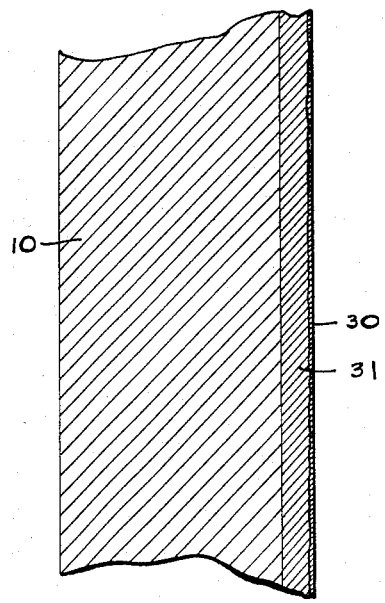

Fig. 2 is a magnified cross-sectional view of a part of the armature.

The invention is shown in the drawings incorporated in a magnetic friction clutch having a driving element in the form of a flat ring 10 constituting an armature whose surface 9 is adapted for axial gripping engagement with a driven element 11 comprising concentric pole pieces 12 terminating in axial faces 13 spanned by the armature ring and separated by segments 14 of non-magnetic friction material whose outer surface is substantially flush with the pole faces. The pole pieces, which are composed of relatively soft magnetic iron, are rigidly joined by a non-magnetic filling 15 such as copper and the inner pole piece is carried by a hub 16 fixed to the driven shaft 17.

The armature ring is riveted at 18 or otherwise secured to a supporting ring 19 splined at 20 on a driving shaft 21 and thus adapted for axial movement into gripping engagement with the friction face of the driven element 11. To increase the wear resistance of its friction face, the armature ring is preferably case-hardened to a very shallow depth 31, on the order of .007 of an inch, so as to present a hardened surface to the friction face of the driven element.

Such axial engagement to derive a friction torque is produced by magnetic flux threading a toroidal circuit 22 formed by the armature 10 and the pole pieces 12 which telescope closely with the concentric pole pieces of a core 23 of magnetic material and having a U-shaped cross-section. Herein, the core is journaled on the hub 16 through a bearing 24 and held against turning by a suitable anchor 25. Magnetic flux for actuating the clutch is created in this instance by energization of a multiple turn winding 26 enclosed by the core.

The clutch constructed as above described is adapted for service use in machines in which the clutch parts are either immersed in oil or thoroughly lubricated by intermittent exposure to oil. Thus, the driving and driven elements may dip in a body 27 of oil retained in a casing 28 enclosing the clutch and associated mechanism. In this environment, it has been found that the iron faces of the magnet poles and armature are apt to become galled during initial service use particularly when the initial engagement of the clutch is under heavy pressure.

In accordance with the present invention, the objectionable galling action above referred to and the difficulties incident thereto are overcome by bonding to one of the iron surfaces 9 or 13 a film or covering 30 of a non-ferrous metal which is so thin as not to detract noticeably from the strength of the magnet and which possesses the property of in effect flowing or becoming smeared across the engaged surfaces under the rubbing incident to gripping of the surfaces under heavy pressure. In this way, it is believed that the voids in the metal surfaces or the depressions between high spots thereon will, during wearing away of the film 30, be kept filled with the non-ferrous metal and the originally jagged surfaces maintained so smooth and lubricated as to prevent the galling under initial heavy duty service or at least until the opposed surfaces have become properly work hardened and worn into full mating contact substantially over their full areas.

The film 30 is preferably of bronze but may be composed of various other relatively soft non-ferrous metals or alloys including copper, brass, etc. It is relatively thin, being less than .001, preferably about .0003 of an inch, so as not to introduce a non-magnetic gap of objectionable width in the flux circuit. While the film may be formed in various ways, it is preferred to form and bond the same to the face of the armature in a single operation as by electroplating and in accordance with procedures well understood in the art. For this purpose, the film is applied to the armature, preferably before mounting on the backing 19 since the entire ring may be submerged in the plating bath.

In service use of a clutch of the above character, the bronze film wears away progressively first off from the higher areas of the armature face 9 and then gradually disappears over the entire surface as the wearing continues. Some of the bronze may be transferred to the opposed pole faces 13 thereby confirming the theory set forth above that the protective action in preventing galling is the result of a flowing of the metal of the film across the iron faces under the rubbing which occurs while the opposed and relatively rotating faces are drawn together under heavy pressure. In any event, the presence of the non-ferrous metal film 30 has been found in practice to act effectually in preventing objectionable galling of either of the faces 9 or 13 and to continue this action during wearing of the faces and until the conditions conducive to galling have been eliminated.

I claim as my invention:

1. A lubricated magnetic friction device comprising a magnet core and an armature composed of magnetic iron and providing a toroidal flux circuit, said core and armature having opposed substantially continuous friction faces drawn into axial gripping engagement with each other by flux threading said circuit, means for supplying lubricant to the face of said core and armature, means supporting said core and armature for such axial engagement and for relative rotation about a common axis, and a thin film of a non-ferrous metal covering the entire active area of one of said friction faces and adapted during initial engagement of said faces under high pressure to prevent galling thereof, said film being deposited on and bonded to said face area and having a thickness less than .001 of an inch.

2. A torque producing device as defined in claim 1 in which said film is bonded to the iron by electrodeposition.

References Cited in the file of this patent

UNITED STATES PATENTS

| | | |
|---|---|---|
| 1,045,781 | Fessenden | Nov. 26, 1912 |
| 1,622,261 | Payne | Mar. 22, 1927 |
| 2,729,318 | Harter | Jan. 3, 1956 |

FOREIGN PATENTS

| | | |
|---|---|---|
| 782,526 | Great Britain | Sept. 11, 1957 |